May 19, 1964
D. R. BARTLEY ETAL 3,133,978
PROCESS FOR FORMING FOAMED POLYURETHANE USING
A SILICONE ELASTOMER CONTAINING MOLD
Filed Aug. 31, 1962
4 Sheets-Sheet 1
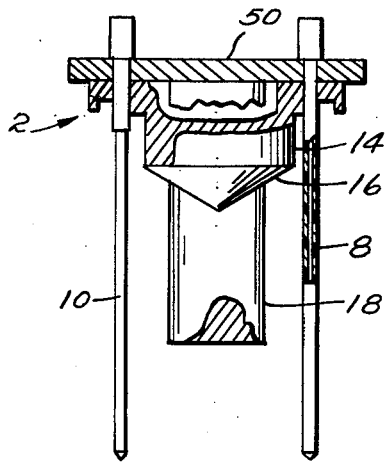
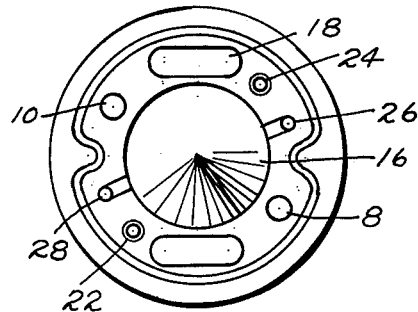
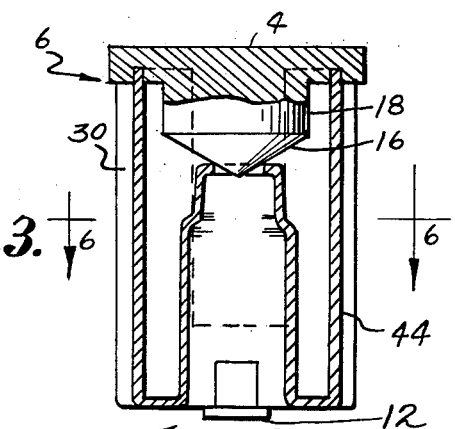
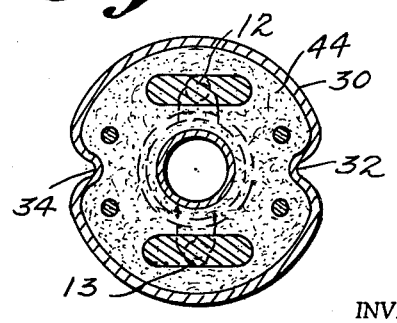
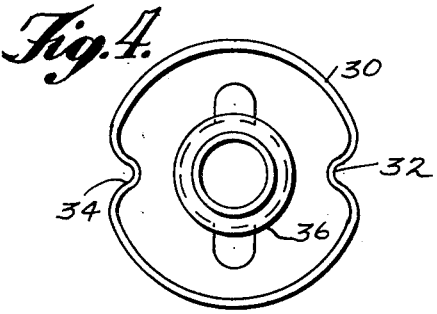
INVENTORS
DONALD R. BARTLEY
GEORGE S. IRBY
BY Cushman, Darby & Cushman
ATTORNEYS May 19, 1964   D. R. BARTLEY ETAL   3,133,978
PROCESS FOR FORMING FOAMED POLYURETHANE USING
A SILICONE ELASTOMER CONTAINING MOLD
Filed Aug. 31, 1962   4 Sheets-Sheet 2
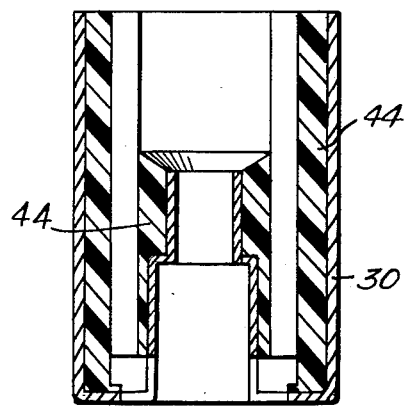
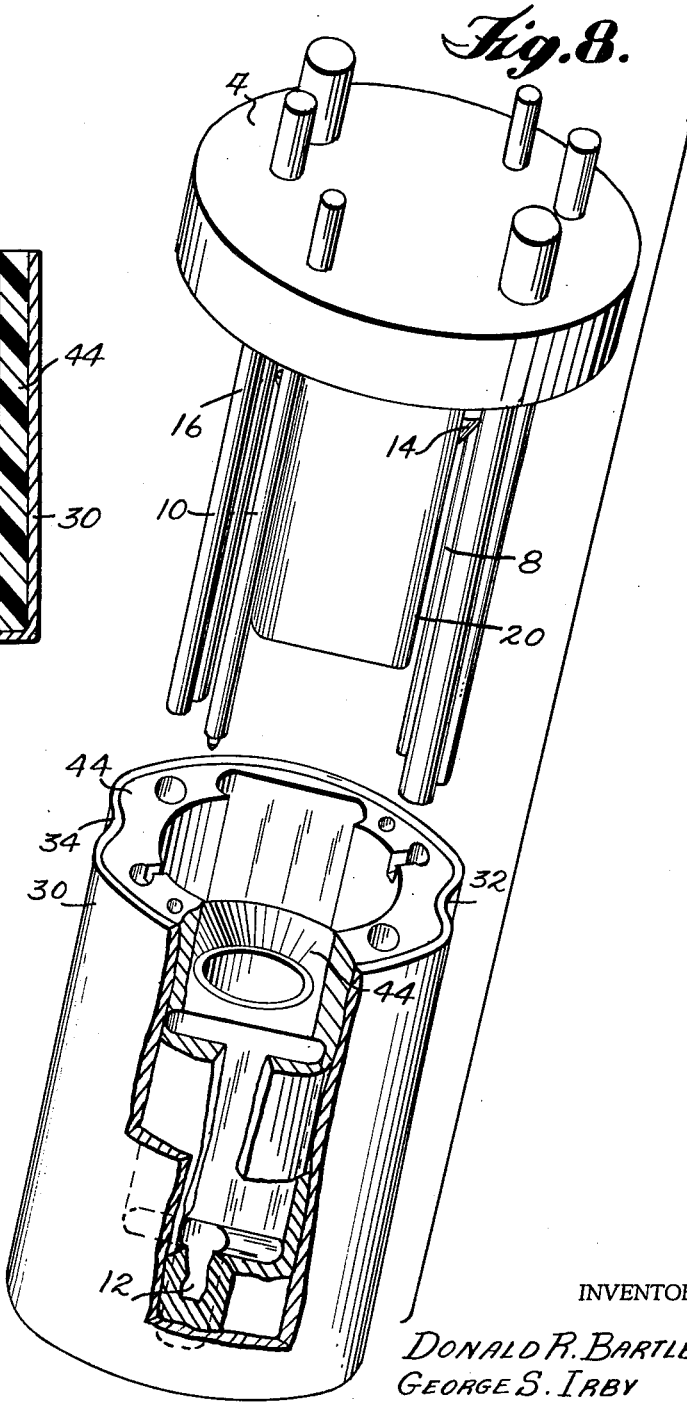
INVENTORS
DONALD R. BARTLEY
GEORGE S. IRBY
BY Cushman, Darby & Cushman
ATTORNEYS

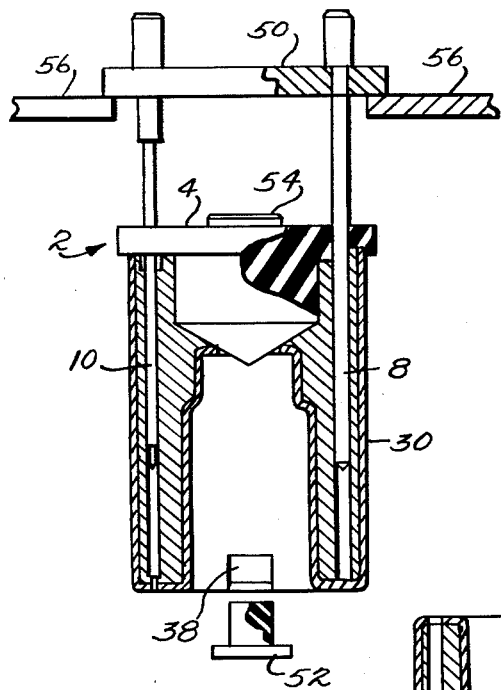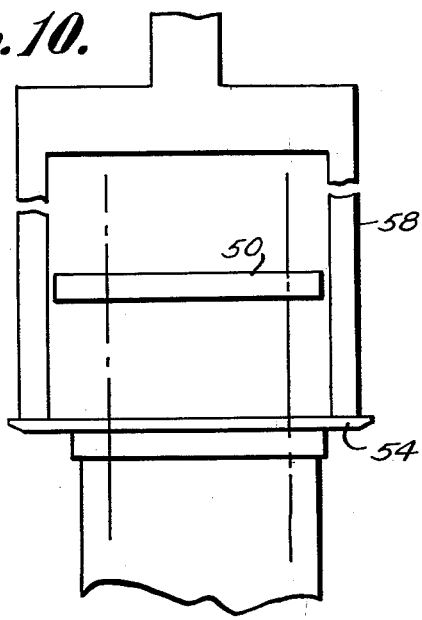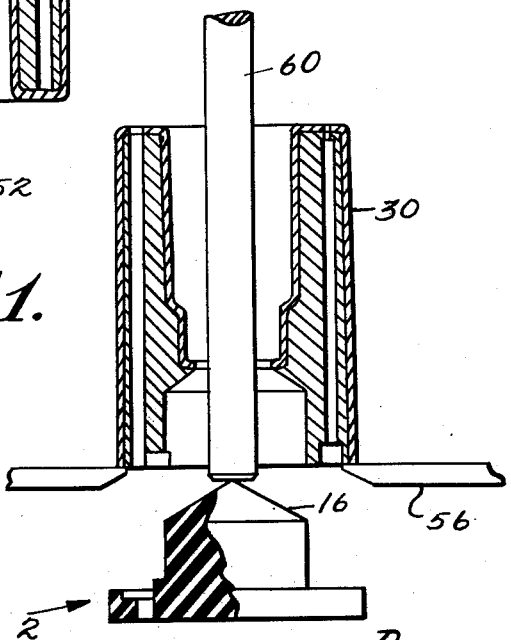

May 19, 1964 D. R. BARTLEY ETAL 3,133,978
PROCESS FOR FORMING FOAMED POLYURETHANE USING
A SILICONE ELASTOMER CONTAINING MOLD
Filed Aug. 31, 1962 4 Sheets-Sheet 4

INVENTORS
DONALD R. BARTLEY
GEORGE S. IRBY
BY Cushman, Darby & Cushman.
ATTORNEYS United States Patent Office 3,133,978
Patented May 19, 1964

3,133,978
PROCESS FOR FORMING FOAMED POLYURETHANE USING A SILICONE ELASTOMER CONTAINING MOLD
Donald R. Bartley, North Dighton, and George S. Irby, Raynham, Mass., assignors to Haveg Industries, Inc., Wilmington, Del., a corporation of Delaware
Filed Aug. 31, 1962, Ser. No. 220,662
9 Claims. (Cl. 264—45)

This invention relates to the manufacture of polyurethane foams.

Polyurethane foams either of the polyester or polyether type when properly formulated and mixed can be cast into conventional molds, such as steel or aluminum and after the resulting foaming action and appropriate cure a molded part of foam is produced that will accurately conform to the contour of the mold.

This process has the disadvantage that the relatively expensive metal molds are tied up for long periods of time during the curing in the mold, e.g., as much as four hours. Additionally there is a mold release problem since the polyurethane foam tends to stick to the mold surface. If a mold lubricant is placed on the male mold to avoid this sticking it has been found that the foam as it is formed removes the lubricant by carrying it up the mold with the result that the foam still sticks to the mold.

As previously indicated aluminum and steel molds are relatively expensive due to the machining required. Additionally a relatively long period of time is required to make such molds. Consequently when more than one or two molds must be made to obtain volume production of polyurethane parts the molder is loath to use such expensive materials.

It is an object of the present invention to make intricate articles in high production from polyurethanes.

Another object is to make polyurethane parts in a manner such that there is good mold release.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained and molded polyurethane foam parts obtained in high production with good mold release by foaming the polyurethane in a rigid plastic shell and utilizing a silicone rubber forming plug. It has been found that the silicone plug is readily removable since when it is pulled upon it stretches to some extent and the diameter becomes smaller. The silicone rubber snaps away from the polyurethane casting. Natural rubber or conventional synthetic rubbers such as butadiene-styrene, butadiene-acrylonitrile and isobutylene-isoprene copolymers do not work satisfactorily since they tend to deteriorate due to the prolonged time of subjection to temperatures in the order of 400° F. as a result of the exotherm in the formation of the foamed polyurethane and the subsequent 1-4 hour or longer cure. The silicone rubbers have been found satisfactory for sustained use over hundreds of molding cycles. In some instances curing of the polyurethane foam is carried out at temperatures of 212° F. or above for 20 hours or more.

As previously indicated the present invention is especially adapted for making intricate objects from polyurethanes. Such objects frequently must have numerous small openings therein. Such is the case of the United States Navy Sonobuoy illustrated in Fortune magazine July, 1962, pages 212–213 which has been successfully cast according to the present invention. The manufacture of a portion of the Sonobuoy is illustrated in the drawings wherein:

FIGURE 1 is a vertical sectional view of the silicone rubber plug or male mold;

FIGURE 2 is a bottom view of the silicone rubber plug and steel molding pins;

FIGURE 3 is a vertical view partially in cross section of the phenolic shell or female mold containing the polyurethane forming materials prior to foaming of the polyurethane;

FIGURE 4 is a top view of the phenolic shell;

FIGURE 5 is a view showing the silicone rubber plug and the phenolic shell with the polyurethane foam therebetween; some of the elements of the mold are omitted for clarity;

FIGURE 6 is a sectional view along the line 6—6 of FIGURE 5;

FIGURE 7 is a vertical sectional view of the completed Sonobuoy; and

FIGURE 8 is an exploded perspective view of the completed Sonobuoy and the silicone plug.

FIGURE 9 is a vertical elevation partially in section illustrating the mechanism for separating the silicone rubber plug from the molded phenolic shell and polyurethane foam;

FIGURE 10 is a diagrammatic view showing the means for removing the steel molding pins;

FIGURE 11 is a vertical section showing the separation of the silicone rubber plug from the molded phenolic shell-polyurethane foam produuct.

Figure 12:
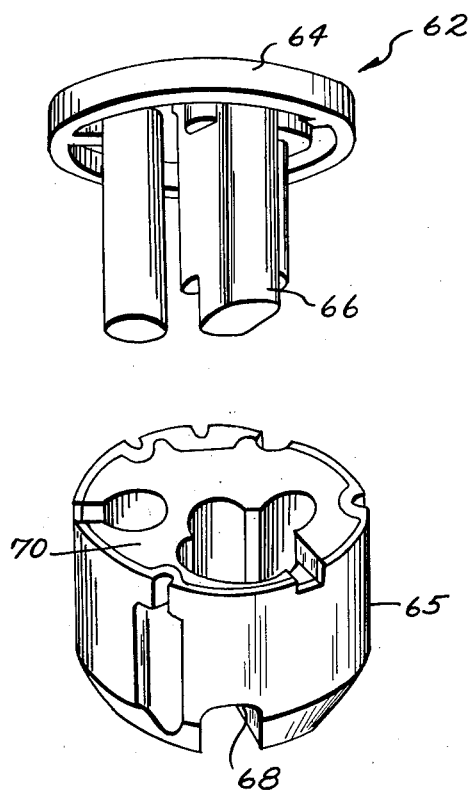
FIGURE 12 is an exploded view of another section of the Sonobuoy.

The invention will be understood best by reference to the drawings where like numerals refer to like parts and wherein 2 generically indicates the primary silicone plug (methyl-vinyl siloxane gum reinforced with silica filler). The plug has an over-all top 4 and a male mold portion 6 connected thereto. The mold portion 6 comprises various elements, such as cylinder 14 and conical portion 16 and slot formers 18 and 20.

When forming tall objects having narrow holes throughout the length of the polyurethane foam it is frequently desirable to employ Teflon (polytetrafluoroethylene) coated steel (or other metal) molding pins to form the holes rather than having elongated tubular members on the silicone plug. It is to be understood, however, that elongated tubular members can be a part of the silicone plugs in place of using the steel pins.

In the specific illustration shown in FIGURES 1–11, however, there was employed a steel pin plate 50 having attached thereto Teflon coated steel molding pins 8, 10, 22, 24, 26 and 28 to form the desired holes during the foaming of the polyurethane.

The female mold 30 is made of a rigid phenol formaldehyde resin and, as is best shown in FIGURE 4, has two indentations 32 and 34 in its generally circular periphery. The interior of the female mold 30 can have any desired configuration, such as that shown at 36 in FIGURES 3 and 4. There are two identical apertures in mold 30 on opposite sides thereof. One of the apertures is shown at 38. Secondary silicone plugs 52 fit into these apertures, e.g., aperture 38, as shown in FIGURES 3 and 5. After removal of secondary plug 52, holes 12 and 13 are drilled in the foamed polyurethane formed.

The polyurethane foam forming ingredients in the form of the liquid mixture 40 are poured into the bottom phenolic shell 30. The polyisocyanate is normally kept separate from the other ingredients until the time of pouring. Consequently, there is a sufficient time lag in the reaction to permit insertion of the silicone plug 2 into the phenolic shell 30 prior to the forming.

As an illustrative example of a suitable foam forming composition there can be used 1.7 parts of a polyester prepared from adipic acid and trimethylol propane having an acid number of 15 to 20, a hydroxyl number of 465 to 495, a Brookfield viscosity of 70,000 to 80,000 cps. (measured at 25° C.), 0.37 part water, 0.07 part dibutyltin dilaurate, 0.12 part polydimethyl siloxane (50 centipoises grade), 0.1 part N-ethyl morpholine and 5.2 parts of toluene diisocyanate (mixture of 80% of the 2,4-isomer and 20% of the 2,6-isomer).

Unless otherwise indicated, all parts and percentages are by weight.

After the liquid mixture 40 is positioned in the female mold 30 and prior to the foaming of the mixture, the silicone plug 2 and Teflon coated pins are positioned inside the female mold in the manner indicated in FIGURE 5. Previously, secondary plug 52 is also inserted in the aperture 38. The top portion 4 of the plug 2 extends entirely across the open upper end 42 of the female mold 30 and effectively closes the same during the foaming or molding operation. After the plug 2 is inserted in the manner shown in FIGURE 5, the polyurethane foam forming materials react and rise to form a rigid foam 44 in all places between the plug or male mold 2 and female mold 30. The plug 2, plate 50, plugs 52 and mold 30 can be secured together by a clamp or other means (not shown) during the foaming action and curing to assure that the foam does not force the plugs 2 or 52 or the Teflon coated pins from the position shown in FIGURE 5. After foaming is complete, the product still in place between the plug 2 and female mold 30 is placed in a curing oven, e.g., at 240° F.–250° F., for one hour.

After removal from the oven, the clamp is released and the foamed polyurethane which is now securely adhered to the phenol-formaldehyde female mold 30 is separated from the silicone elastomer plugs, steel pin plate and Teflon coated pins in the manner described below.

The assembly (steel pin plate and molding pins, silicone rubber molding plugs, phenolic shell with rigid foamed polyurethane core) is dropped between two parallel plates. As a result of inertia, there is a slight separation of the steel pin plate 50 from the top 4 of the silicone plug 2. A stripper bar 54 is then positioned on top of the silicone plug 2 as shown in FIGURES 9 and 10. The steel pin plate 50 is then placed upon stationary retaining fingers 56. A stripping fork 58 is then thrust in the direction indicated by the arrow in FIGURE 10 to separate the steel pin plate 50 containing the Teflon coated steel pins 8, 10, etc. from the rest of the assembly.

The silicone plug 2 is removed from the phenolic shell 30 containing the rigid polyurethane foam core by placing the shell 30 on the stationary stripping fingers in the position indicated in FIGURE 11. Then a rod 60 is thrust into the phenolic shell in the direction of the arrow in FIGURE 11 to force out the silicone plug 2.

The secondary or bottom silicone rubber plugs 52 are removed merely by hand stripping, i.e., they are simply snapped out of the assembly. This can be done either before or after removal of the silicone rubber molding plug 2 or even before removal of the Teflon coated steel pins.

When steel pins are employed, they are coated with Teflon to prevent adherence of the pins to the foamed polyurethane.

The molded product has openings therein which correspond to the solid elements of the mold portion of 6 of the plug 2, the Teflon coated steel pins, and the silicone bottom plugs 52. Additionally, there are openings 12 drilled at the indicated places in the foamed polyurethane.

The piece shown in FIGURES 1–11 has an over-all height of 140 mm. When preparing smaller pieces or pieces which do not have elongated holes therethrough, even greater savings in cost can be made by eliminating the steel pins completely. This is shown by FIGURE 12 wherein another portion of the Sonobuoy having a height of 70 mm. is shown. The silicone rubber forming plug 62 has a top 64 which completely covers the top of the phenol-formaldehyde resin shell 65. The various elements of the forming plug as indicated by rod 66, for example, form the holes in the foamed polyurethane 70. The openings 68 in the shell 65 are substantially completely closed by the rods 66 during the foaming operation so that the foam does not fill such openings. In this form of the invention there is no need to employ the stripping mechanism shown in FIGURES 9–11. Instead, the silicone rubber forming plug 62 is merely snapped out of the molded product after curing of the polyurethane foam. It is possible to do this as set forth supra because the silicone rubber is readily able to stretch longitudinally and decrease in width. Additionally, the silicone rubber does not adhere too tightly to the polyurethane foam.

The silicone plugs in the specific examples were formed from a mixture of 100 parts of a polymer of a methyl-vinyl siloxane gum, 25 parts of a finely divided reinforcing silica filler, and 1 part of 2,4-dichlorobenzoyl peroxide. The methyl-vinyl siloxane gum was prepared by adding 0.5% by weight of methylvinyldichlorosilane to dimethyldichlorosilane containing 0.15 mol percent methyl-trichlorosilane and hydrolyzing the resultant mixture and treating the liquid silicone hydrolysis product with ferric chloride, as described in Marsden Patent 2,445,794. The mixture of the methyl-vinyl siloxane gum, silica filler and peroxide was molded into the desired shape in a conventional rubber mold using conventional molding techniques, e.g., 302° F. for 10 minutes followed by baking at 350° F. for 12 hours.

In this manner hundreds of silicone rubber forming plugs can be produced at a small fraction of the cost of metal molds.

The silicone rubber plugs are preheated to a temperature of 200° F. and dipped into a water-soluble synthetic detergent, e.g., sodium dodecylbenzene sulfonate, heated again to 200° F. to a dry state, approximately 10 minutes and then assembled with the phenolic shells to mold the foamed polyurethane.

There can be used any of the gums disclosed in the Marsden patent. Normally, the range of proportions is:

| | Parts |
|---|---|
| Gum | 100 |
| Filler | 10–40 |
| Peroxide | 0.5–1.5 |

As the gum there can be used any of the gums disclosed in the Marsden patent, more especially, solid, elastic, curable, hydrocarbon-substituted polysiloxanes, consisting of silicon and oxygen atoms, and methyl-substituted and vinyl-substituted silicon atoms, wherein the average ratio of the sum of the methyl and vinyl groups per silicon atom is from 1.95 to 2.00 and from 0.18 to 2.0% of the silicon atom are connected to at least one vinyl group.

As the filler, in addition to silica, there can be used titanium dioxide, carbon black, talc, zinc oxide, or other fillers.

Other peroxides and per compounds can be used such as benzoyl peroxide, cumene hydroperoxide, tertiary butyl perbenzoate, di(t-butyl) peroxide.

While the above-described silicone rubbers are preferred, there can be used other silicone rubbers or elastomers, such as those set forth in Krieble Patent 2,457,-688, Agens Patent 2,448,756, Wright Patent 2,448,565, Sprung Patent 2,484,595, Marsden Patent 2,521,528, Hyde Patent 2,571,039, Kilbourne Patent 2,709,161, Warrick Patent 2,718,512, Polmanteer Patent 2,927,907, Konkle Patent 2,927,908 and Pike Patent 2,953,543. Thus, there can be used a polymeric dimethyl siloxane containing (a) 0.4 to 5 mol percent copolymerized monomethylsiloxane and (b) copolymerized trimethylsiloxane in an amount equal to 40 to 95% of the number of monomethyl substituted silicon atoms, e.g., the products of Example 1 of the Krieble patent; polymeric dimethyl siloxane gums, as in the Agens patent; elastic, curable, solid methyl and phenylpolysiloxane containing 1.98 to 2.00 total methyl and phenyl radicals per silicon atom, the solid polysiloxane having been obtained by condensing a liquid consisting of polymeric dimethylsiloxane containing up to 2 mol percent copolymerized monomethylsiloxane and from 3 to 30 mol percent copolymerized diphenylsiloxane, e.g., the product of Example 1 of the Sprung patent; a solid, elastic, curable, polymerized hydrocarbon substituted polysiloxane containing an average of from 1.95 to 2.05 hydrocarbon or halohydrocarbon groups per silicon atom, the hydrocarbon groups being alkyl, aryl or aralkyl, e.g., methyl, ethyl, isopropyl, phenyl, naphthyl, benzyl, cyclohexyl, bromophenyl, chlorophenyl, tetrafluoroethyl, heptafluoropropyl and chlorohexafluorocyclopentyl.

The present invention can be used to form any of the conventional polyurethane foams. In preparing urethane foams a rigid foam is made by utilizing a polyhydroxy-containing compound having a hydroxyl number of about 250–750; a semi-rigid foam is prepared if the hydroxyl number is 75–250 and a flexible foam is prepared if the hydroxyl number is 25–75. Both polyesters and polyethers can be used to make the foams. Furthermore, instead of forming the polyurethane it situ a prepolymer can be employed and this material then foamed.

In place of foaming by reaction with water, foams can be prepared by uniformly distributing a liquefied halogen-substituted alkane containing at least one fluorine atom in its molecule and having a boiling point at one atmosphere not higher than 80° F., and preferably not lower than −60° F. in the polyhydroxy compound reactant or the polyisocyanate reactant, and then mixing the reactants whereupon the temperature of the mixture rises during the ensuing reaction above the boiling point of the liquefied gas to produce a porous polyurethane. Such fluorine-containing compounds include dichlorodifluoromethane, dichloromonofluoromethane, chlorodifluoromethane and dichlorotetrafluoroethane. The general procedure for foaming with such fluorine-containing compounds is illustrated by General Tire British Patent 821,-342.

In preparing the polyurethane there can be employed organic polyisocyanates, such as toluene-2,4-diisocyanate, toluene-2,6-diisocyanate, m-phenylene diisocyanate, 4-methoxy-1,3-phenylene diisocyanate, diphenyl methane-4,4′-diisocyanate, 4-chloro-1,3-phenylene diisocyanate, 4-isopropyl-1,3-phenylene diisocyanate, 2,4-diisocyanato-diphenylether, 3,3′ - dimethyl - 4,4′-diisocyanatodiphenyl methane, mesitylene diisocyanate, durylene diisocyanate, 4,4′-methylene-bis(phenylisocyanate), benzidine diisocyanate, o-nitrobenzidine diisocyanate, 4,4′-diisocyanato dibenzyl, 3,3′-bitolylene-4,4′-diisocyanate, 1,5-naphthalane diisocyanate, tetramethylene diisocyanate, hexamethylene diisocyanate, toluene-2,4,6-triisocyanate, tritolylmethane triisocyanate, 2,4,4′-triisocyanato diphenyl ether, PAPI (liquid polymethylene polyisocyanate) 1,3,5-benzene triisocyanate, the reaction product of toluene diisocyanate with trimethylolpropane at an NCO/OH ratio of 2:1 (Mondur CB), the reaction product of toluene diisocyanate with 1,2,6-hexanetriol at an NCO/OH ratio of 2:1. Alternatively, as the polyisocyanate there can be used prepolymers made by reacting one or more of the above polyisocyanates with a polyhydroxy compound such as a polyester having terminal hydroxy groups, a polyhydric alcohol, hydroxy-containing glycerides, etc. The prepolymer, in such case, should have terminal isocyanate groups. As prepolymers there can be employed prepolymers from toluene diisocyanate and castor oil or blown tungoil or blown linseed oil or blown soya oil, tolune diisocyanate and the polyester of ethylene glycol, propylene glycol and adipic acid having a molecular weight of 1900, described in Example 1 of Kohrn Patent 2,953,839 (as well as the isocyanate terminated prepolymers in Examples II–VIII of the Kohrn patent), toluene diisocyanate and polytetramethylene glycol molecular weight of 1000, benzene triisocyanate and polypropylene glycol molecular weight 2025, toluene diisocyanate and dipropylene glycol, toluene diisocyanate and glycerine-propylene oxide adduct having a molecular weight of 1000 or the corresponding glycerine-propylene oxide adduct of molecular weight 3000, toluene diisocyanate and 1,2,6-hexanetriol-propylene oxide adducts of molecular weights 500, 700 and 1500, toluene diisocyanate and a mixture of 98% polypropylene glycol molecular weight 750 with 2% 1,2,6-hexanetriol, toluene diisocyanate and a mixture of polypropylene glycol molecular weight 995 and castor oil, as described in Example 2 of Kane Patent 2,955,091, as well as the other prepolymers set forth in Examples 1 and 3–11 of the Kane patent, toluene diisocyanate and polypropylene glycol molecular weight 1800 of Example I of Swart Patent 2,915,496, toluene diisocyanate and tris (dipropylene glycol) phosphite, toluene diisocyanate-1,2,6-hexanetriol adduct, toluene diisocyanate and polyester from adipic acid trimethylolpropane.

As the polyhydroxy compound to form the polyurethane there can be used polyethylene glycols having molecular weights of 400 to 3000, polypropylene glycols of molecular weights of 400 to 3000, ethylene glycol, diethylene glycol, triethylene glycol, propylene glycol tris (dipropylene glycol) phosphite, dipropylene glycol, glycerol, 1,4-butanediol, glycerol-propylene oxide adduct molecular weight 1000, glycerol-propylene oxide adduct molecular weight 3000, trimethylolpropane, 1,2,6-hexanetriol-propylene oxide adducts of molecular weight 750, 1500, 2400 and 4000, octakis (2-hydroxypropyl) sucrose, castor oil, blown linseed oil, mixed ethylene glycol-propylene glycol adipate resin molecular weight 1900, polyethylene adipate phthalate, polyneopentylene sebacate, polyester including 1 mol of trimethylol propane for each 3000 to 12,000 molecular units of 1,4-butanediol and adipic acid, polyester from 16 mols adipic acid, 16 mols diethylene glycol and 1 mol of trimethylol propane, tris (polypropylene glycol molecular weight 2025) phosphite, polyester from adipic acid and propylene glycol, polyesteramides, polyesters from succinic, fumaric, maleic, itaconic, malonic, phthalic or sebacic acid with ethylene glycol, propylene glycol, 1,2,6-hexanetriol or glycerine.

The preferred polyurethane foams are rigid foams. Curing is done under conventional conditions, e.g., 100°–130° C. for 1–24 hours.

For the female mold 30 to which the polurethane foam is adhered there can be used any rigid thermosetting resin or thermoplastic resin which will withstand a temperature of 400° F., for the requisite time, e.g., 1 hour. Examples of thermosetting resins include phenol-formaldehyde, phenol-furfural, m-cresolformaldehyde, furfuryl alcohol, furfuryl alcohol-furfural, and furfuryl alcohol-formaldehyde resins, as well as epoxy resins, e.g., bisphenol A-epichlorhydrin, cross-linked polyester resins, e.g., styrene modified propylene glycol maleate-phthalate, diallyl phthalate resins, triallyl cyanurate resins, butadiene-acrylonitrile-styrene resin, melamine-formaldehyde resin, urea-formaldehyde resin.

As thermoplastic resins there can be used polyamides, such as polymeric hexamethylene adipamide, polytetrafluoroethylene, polychlorotrifluoroethylene, polyoxymethylene (Delrin), copolymers of trioxane with cyclic ethers, such as ethylene oxide and dioxolane (Celcon resins).

We claim:
1. In a method of forming a foamed polyurethane between a plurality of molds and wherein there is a strong exotherm during the foaming reaction and wherein one of said molds is a rigid shell to which the foamed polyurethane strongly adheres, the improvement comprising employing a silicone elastomer as at least a major part of the foam contacting surface of a second of said molds whereby said foamed polyurethane can be readily released from said second mold while still retaining its adherence to said one mold.

2. A method of forming a rigid intricately shaped foamed polyurethane between a male mold and a female mold wherein one of said molds is a rigid plastic and wherein at least a major part of the other mold is a silicone elastomer, comprising foaming the polyurethane forming materials at an elevated temperature between said molds, forming a strong adherence of the foamed polyurethane to said rigid plastic and thereafter removing said silicone elastomer containing mold from the foamed polyurethane.

3. A process according to claim 2 wherein the silicone elastomer is stretched to aid in removing it from the foamed polyurethane.

4. A process according to claim 3 wherein the silicone elastomer containing mold is composed completely of silicone in the portions which contact the polyurethane foam.

5. A process according to claim 2 wherein the silicone elastomer containing mold is the male mold and is snapped out of the rigid plastic-foamed polyurethane.

6. A process according to claim 2 wherein the rigid plastic is a phenol-formaldehyde resin.

7. A process according to claim 2 wherein the foamed polyurethane is cured at an elevated temperature prior to removal of the silicone elastomer containing mold.

8. A method of forming an intricately shaped foamed polyurethane between a female mold made of a rigid plastic and a male mold, the major portion of which is a silicone elastomer, said female mold having a central aperture therein and said male mold closing said aperture; said method comprising foaming the polyurethane forming materials at an elevated temperature between said molds, forming a strong adherence of the foamed polyurethane to said rigid plastic female mold and thereafter removing said silicone elastomer male mold by the application of thrusting force into the central opening in the female mold to forcefully remove the silicone elastomer from said opening.

9. A method of forming an intricately shaped rigid foamed polyurethane between a rigid plastic female mold and a male mold, the major part of which is a silicone elastomer and having metal pins extending through said male mold into said female mold, said metal pins being united to a metal plate which is above and contacting said male mold during the molding process, said method comprising foaming the polyurethane forming materials at an elevated temperature between said molds, forming a strong adherence of the foamed polyurethane to said rigid plastic female mold, thereafter dropping the entire assembly a distance sufficient that inertia causes a slight separation of the metal plate from the male mold positioning a stripper bar on top of the male mold, positioning said metal plate on top of stripping means, removing said metal plate and attached metal pins from said assembly by applying pressure to said stripping means and thereafter removing said silicone elastomer mold from the female mold containing the rigid polyurethane foam core by applying force to said female mold.

References Cited in the file of this patent

UNITED STATES PATENTS

| | | |
|---|---|---|
| 2,065,934 | Deutschmann | Dec. 29, 1936 |
| 2,835,924 | Schmeling | May 27, 1958 |
| 3,012,273 | Lewis | Dec. 12, 1961 |
| 3,020,587 | Alderfer et al. | Feb. 13, 1962 |
| 3,064,069 | Ange | Nov. 13, 1962 |
| 3,066,351 | Schriner | Dec. 4, 1962 |